(12) United States Patent
Aizawa

(10) Patent No.: US 8,087,717 B2
(45) Date of Patent: Jan. 3, 2012

(54) LIGHT WEIGHT DEVICES AND RELATED METHODS FOR REINFORCING AN AUTOMOTIVE ROOF ASSEMBLY

(75) Inventor: Nobuo Aizawa, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 420 days.

(21) Appl. No.: 12/185,243

(22) Filed: Aug. 4, 2008

(65) Prior Publication Data
US 2010/0026050 A1   Feb. 4, 2010

(51) Int. Cl.
B62D 25/06   (2006.01)
(52) U.S. Cl. .................. 296/187.13; 296/30; 296/210
(58) Field of Classification Search .................. 296/30, 296/187.13, 193.12, 210, 211, 214, 29, 187.03; 52/731.6, 232
See application file for complete search history.

(56) References Cited

U.S. PATENT DOCUMENTS

| | | | | |
|---|---|---|---|---|
| 4,470,619 A | * | 9/1984 | Imajyo et al. ................. 280/808 |
| 4,601,511 A | * | 7/1986 | Nakamura et al. ............. 296/210 |
| 4,634,173 A | * | 1/1987 | Aonuma et al. ......... 296/203.04 |
| 4,883,309 A | * | 11/1989 | Miyazaki et al. ........ 296/193.09 |
| 5,018,781 A | * | 5/1991 | Kumasaka et al. ............ 296/210 |
| 5,052,743 A | * | 10/1991 | Inada et al. .................... 296/210 |
| 5,318,338 A | * | 6/1994 | Ikeda ............................. 296/210 |
| 5,570,558 A | * | 11/1996 | Persson ....................... 296/146.6 |
| 5,735,569 A | * | 4/1998 | Takagi et al. .................. 296/210 |
| 6,053,564 A | * | 4/2000 | Kamata et al. ............ 296/187.09 |
| 6,676,183 B2 | * | 1/2004 | Yoshida et al. ................. 296/30 |
| 6,705,668 B1 | * | 3/2004 | Makita et al. ............ 296/187.03 |
| 6,786,538 B1 | * | 9/2004 | Turk et al. ................. 296/216.01 |
| 6,830,287 B1 | * | 12/2004 | Aghssa et al. ........... 296/187.11 |
| 6,951,366 B2 | * | 10/2005 | Tomita ...................... 296/187.08 |
| 7,134,711 B1 | * | 11/2006 | Yoder ............................ 296/210 |
| 7,213,874 B2 | * | 5/2007 | Osterberg et al. .............. 296/210 |
| 7,249,797 B2 | * | 7/2007 | Wolkersdorfer et al. 296/203.04 |
| 7,407,223 B2 | * | 8/2008 | Ito et al. ................... 296/193.07 |
| 7,445,269 B2 | * | 11/2008 | Yustick et al. ........... 296/187.01 |
| 7,510,234 B2 | * | 3/2009 | Ameloot et al. ......... 296/187.12 |
| 7,631,918 B2 | * | 12/2009 | Yasukouchi et al. ............ 296/30 |
| 7,762,622 B2 | * | 7/2010 | Lakic ........................ 296/193.06 |
| 7,823,958 B2 | * | 11/2010 | Sato ............................ 296/183.1 |
| 7,828,370 B2 | * | 11/2010 | Ohi et al. .................. 296/187.08 |
| 2001/0020797 A1 | * | 9/2001 | Saeki ........................ 296/203.03 |
| 2004/0104598 A1 | * | 6/2004 | Barz et al. ................. 296/187.02 |
| 2006/0055207 A1 | * | 3/2006 | Reinhardt ................. 296/193.07 |
| 2006/0103172 A1 | * | 5/2006 | Veen et al. ..................... 296/214 |
| 2006/0202518 A1 | * | 9/2006 | Osterberg et al. ......... 296/193.12 |
| 2007/0176467 A1 | * | 8/2007 | Watanabe et al. ............. 296/210 |
| 2008/0143144 A1 | * | 6/2008 | Yustick et al. ........... 296/187.03 |

FOREIGN PATENT DOCUMENTS

JP    04081367 A   *   3/1992
JP    05069856 A   *   3/1993

* cited by examiner

Primary Examiner — Glenn Dayoan
Assistant Examiner — Paul Chenevert
(74) Attorney, Agent, or Firm — Wesly A. Alig, Esq.; Emerson Thomson Bennett

(57) ABSTRACT

The exemplary embodiments generally relate to a device for reinforcing an automotive roof assembly. Some embodiments include a stiffening member for attaching to a cross member of an automotive roof assembly. The stiffening member may have a plurality of supports for providing additional stiffness in longitudinal, lateral, and/or vertical directions. Some embodiments relate to methods of making and/or using the device.

28 Claims, 3 Drawing Sheets

US 8,087,717 B2

LIGHT WEIGHT DEVICES AND RELATED METHODS FOR REINFORCING AN AUTOMOTIVE ROOF ASSEMBLY

I. BACKGROUND OF THE INVENTION

A. Field of Invention

This invention generally relates to light-weight devices and related methods for reinforcing automotive roof assemblies thereby reducing windshield vibration.

B. Description of the Related Art

One source of road noise in automobiles is due to vibration of the windshield. Attempts have been made to reinforce the windshield and surrounding roof assembly in order to reduce vibration, and therefore reduce noise experience by the occupant. In one prior attempt, a reinforcing device comprising a cross member was added to the roof assembly to reinforce the windshield. This had a positive effect in reducing noise, but still allowed significant vibration due to the cross member's tendency to flex under a load. Thus, the cross member needed to be stiffened. In another attempt to reduce road noise, the cross member was modified by increasing the thickness of the sheet metal from which it was stamped thereby increasing its stiffness. However, this modification actually resulted in increased noise due to the weight added to the cross member by increasing its thickness.

The exemplary embodiments provide devices and methods for reducing road noise due to windshield vibration.

II. SUMMARY OF THE INVENTION

Some exemplary embodiments relate to an automotive roof reinforcing device having a cross member. The cross member can comprise a top surface and a bottom surface spaced apart from the top surface in a parallel relation and defining a substantially uniform thickness; a first pair of sides spaced apart from each other and defining a width; a second pair of sides spaced apart from each other and defining a length, each of the second pair of sides being adapted to attach to an automotive roof assembly; and a longitudinal channel defined by a contour of the top surface, the channel having a depth and extending along at least a portion of the length of the cross member, and the channel having a front wall, a back wall, and a floor, wherein each of the front wall, the back wall and the floor are defined by the top surface of the cross member and contours thereof; and a reinforcing member disposed at least partially in the longitudinal channel of the cross member, the reinforcing member comprising: at least one longitudinal support, the longitudinal support attaching to the back wall of the channel, extending away from the back wall, and extending along at least a portion of the back wall in a parallel direction; at least one lateral support, the lateral support having a first end attached to the front wall of the longitudinal channel and a second end in a fixed mechanical relation to the back wall of the longitudinal channel; and at least one vertical support having a first end attaching to the lateral support, and a second end attaching to the floor of the longitudinal channel; and at least one oblique longitudinal support having a first end attached to the longitudinal support and a second end attached to the floor of the longitudinal channel, the oblique support oriented at an oblique angle relative to the longitudinal support.

Other benefits and advantages will become apparent to those skilled in the art to which it pertains upon reading and understanding of the following detailed description.

III. BRIEF DESCRIPTION OF THE DRAWINGS

The exemplary embodiments may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
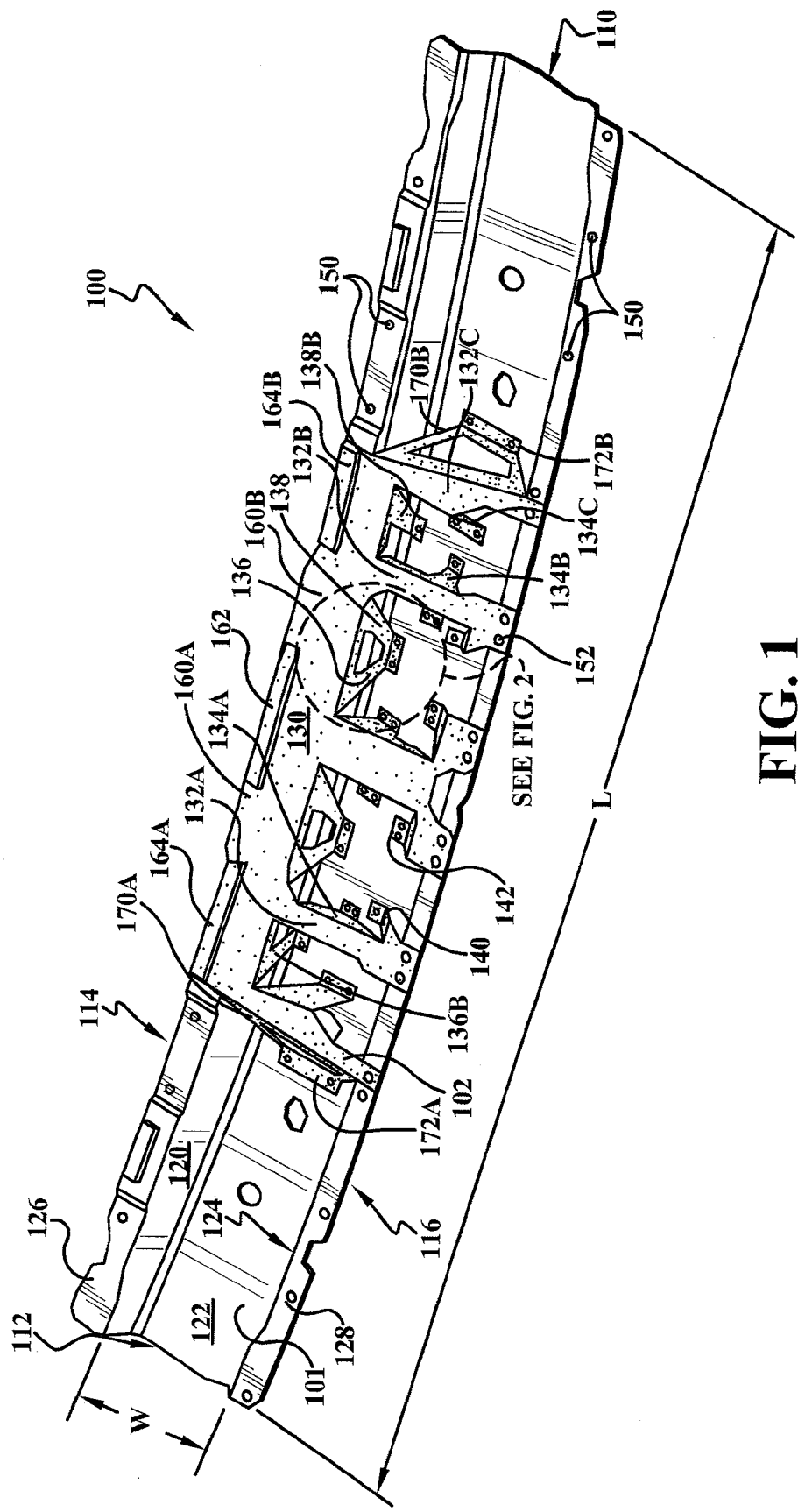
FIG. 1 is a drawing of an embodiment comprising a cross member and a stiffener.

As used herein the term attached encompasses mechanical relationships between a plurality of bodies including adhesively bonded, welded, fused, soldered, and/or brazed relations. Attached also includes fastened, for instance with a fastener such as a bolt, rivet, pin, and/or screw. Attached can additionally include press fitted, snap fitted, and/or interlocking relations. Furthermore, attached also includes relationships where a single body forms a plurality of continuous yet identifiable portions. For instance, a piece of sheet metal can be stamped to form a part having a pair of sides and a floor, wherein the sides and floor are attached to one another because they are all continuous portions of the same body.

The exemplary embodiments generally relate to devices and methods for reinforcing a forward portion of an automotive roof assembly, and reducing windshield vibration. In one exemplary embodiment a reinforcing means includes a cross member defining a channel running in a longitudinal direction relative to the cross member, and a stiffening means disposed at least partially in the longitudinal channel. Thus, the cross member defines a length or longitudinal direction, a width or lateral direction, and a depth or vertical direction. According to this embodiment the stiffening means attaches to the cross member and provides additional support in the longitudinal, lateral and/or vertical directions.

The cross member can comprise any of a wide variety of materials commonly used in automotive applications. For instance, in one embodiment the cross member comprises a material selected from one or more of aluminum, aluminum alloy, steel, stainless steel, titanium and the like or any combination thereof. A suitable thickness of a cross member material can be from about 0.1 to 1.0 inch. Furthermore, the cross member can be made by any of a wide variety of known methods including stamping, forging, bending, casting, sintering, welding and the like or any combination thereof. Suitable cross members can comprise a unitary structure or can comprise an assembly of a plurality of components.

The longitudinal channel of the cross member can take a variety of forms according to the specific application. For example, the longitudinal channel can have an approximately triangular, rectangular, higher polygonal, circular, elliptical, or conical cross section and the like or any combination thereof. A cross member having any of these geometric arrangements can include a longitudinal channel having a front wall, a back wall and a floor. Although, in some embodiments, such as those having circular, elliptical or conic cross sections, the front wall, back wall, and floor may comprise different general regions of a single wall, and may not have clearly distinguished boundaries therebetween.

The channel can also comprise an open or closed surface. For instance, in one embodiment the channel is formed by stamping metal sheet stock, thereby forming an open surface. But in an illustrative alternative embodiment, a pair of stamped parts can be assembled with the channels in an opposing orientation, thereby forming a closed surface. Either arrangement can be suitable depending on the specific application.

The length of the longitudinal channel can also vary across a wide range according to the desired properties. For instance, the channel can extend along greater than 90% of the length of the cross member. Such embodiments can accommodate a longer stiffening member disposed within the longitudinal channel. In other embodiments the longitudinal channel can extend along about 10 to 100% of the length of the cross member.

The cross member can include one or more means for attaching to an automotive roof assembly. Such means for attaching can be disposed, for instance, near opposing longitudinal ends of the cross member. For example, the opposing longitudinal ends can include a means for attaching the cross member to an automotive roof assembly. In some embodiments an outer portion of the front wall and/or back wall of the longitudinal channel can each have a means for attaching to an automotive roof assembly.

A stiffening member can be unitary or can be an assembly made from a plurality of components. Suitable stiffening members can comprise any of a wide variety of materials commonly used in automotive applications. For instance, in one embodiment the stiffening member comprises a material selected from one or more of aluminum, aluminum alloy, steel, stainless steel, titanium and the like or any combination thereof. Furthermore, in embodiments where the stiffening member comprises an assembly, each part can be independently selected from any of these materials.

A suitable thickness of a stiffening member material can be from about 0.1 to 1.0 inch. In embodiments where the stiffening member comprises an assembly, each part can be independently selected from any of the foregoing thicknesses. Suitable stiffening members can be made by any of a wide variety of known methods including stamping, forging, bending, casting, sintering, welding and the like or any combination thereof.

In some embodiments, a stiffening member can comprise at least one longitudinal support, at least one lateral support, at least one vertical support and at least one oblique support. A longitudinal support can comprise an elongate structure defining a longitudinal axis. The longitudinal support is adapted to be installed so that the longitudinal axis is in an approximately parallel orientation relative to the longitudinal channel of the cross member. According to some embodiments, the longitudinal support can define a plane that is approximately perpendicular to the back wall of the longitudinal channel. Furthermore, in some embodiments the longitudinal support is adapted to attach to the back wall of the longitudinal channel. Suitable means for attaching the longitudinal support to the back wall include, without limitation, adhesively bonding, welding, fusing, soldering, brazing, bolting, riveting, pinning, screwing, press fitting, snap fitting, interlocking, and the like or any combination thereof. Additionally, in some embodiments the longitudinal support can comprise a continuous portion of the cross member rather than a distinct part.

The lateral support can comprise a first and a second end spaced apart and defining a lateral axis. The lateral axis is approximately perpendicular to the longitudinal axis of the longitudinal support. The first end can be attached to the front wall of the longitudinal channel, and the second end can be in a fixed mechanical relation to the back wall of the longitudinal channel. In some embodiments, a fixed mechanical relation includes the second end being attached to the longitudinal support, which in turn attaches to the back wall. Accordingly, the lateral support is held in a fixed relation to the back wall without directly attaching to the back wall. In other embodiments the lateral support is directly attachable to the back wall.

The at least one vertical support can comprise a first end attaching to the lateral support, and a second end attaching to the floor of the longitudinal channel. In some embodiments the vertical support does not contact the front and/or back walls of the longitudinal channel. Furthermore, in some embodiments the vertical support does not contact the longitudinal support.

The at least one oblique support can be disposed in a plane that is perpendicular to the lateral support and to the longitudinal support. According to some embodiments, the oblique support includes a first end attached to the longitudinal support and a second end attached to the floor of the longitudinal channel. The oblique support can be oriented at an angle $\theta$ relative to the longitudinal support, wherein 180° is equal to the sum of angles $\theta$ and $\phi$. In some embodiments, angle $\theta$ can be from about 20° to 80°. Furthermore, some embodiments can additionally include an opposing oblique support. In such embodiments, the opposing oblique support is oriented at an angle $\phi$ relative to the longitudinal support. Optionally, a pair of opposing oblique supports can be oriented so that their second ends contact each other.

Figure 3:
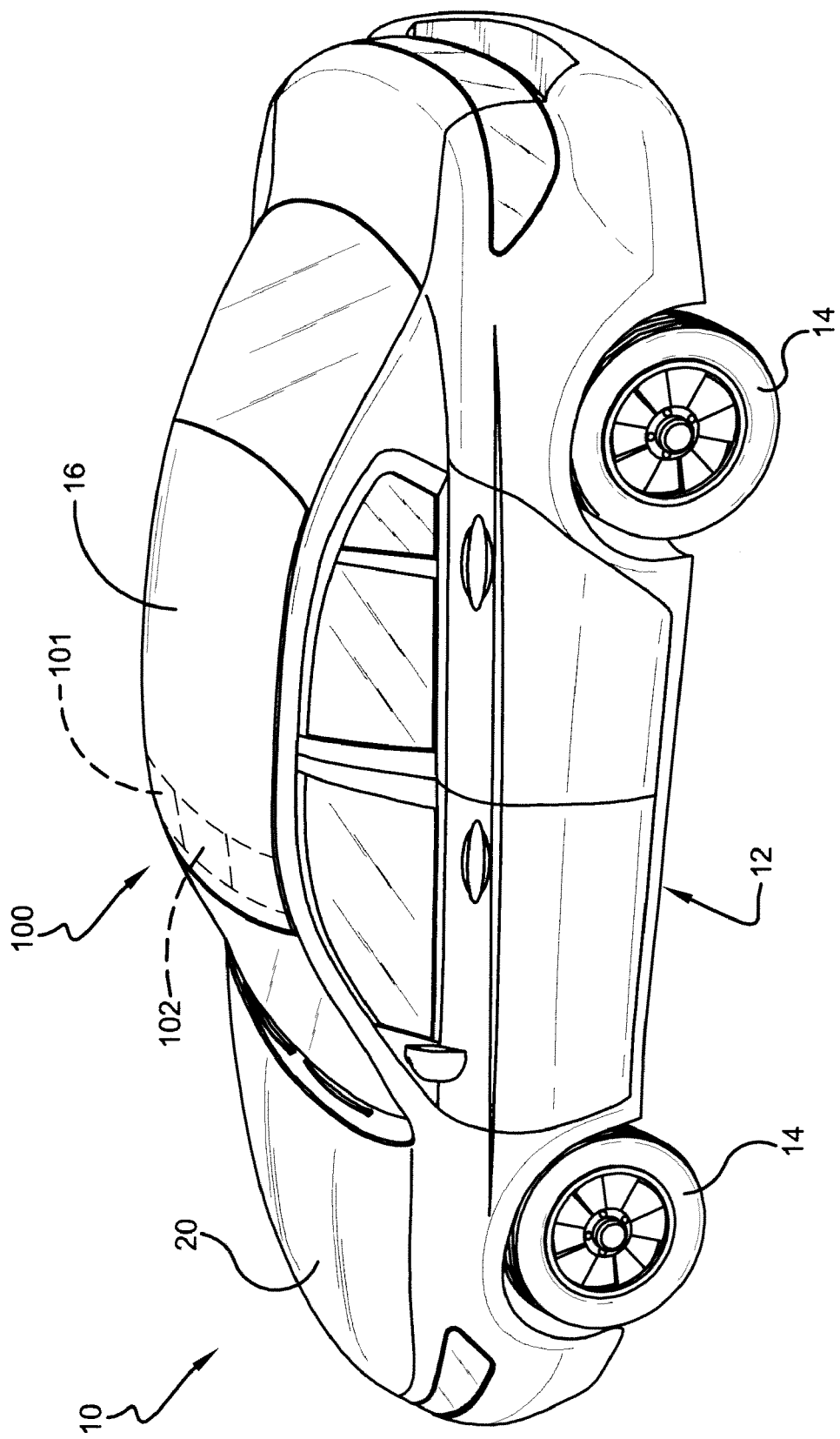
FIG. 3 is a perspective view of a vehicle including a roof, according to one embodiment.

Referring now to the drawings wherein the showings are for purposes of illustrating exemplary embodiments only and not for purposes of limiting the same, FIG. 1 is a drawing of an automotive roof reinforcing device 100 comprising a cross member 101 and a stiffening member 102. FIG. 3 is a drawing of vehicle 10 including a frame 12, one or more ground engaging wheels 14, and a roof 16, which can include the automotive roof reinforcing device 100. The cross member 101 shown in FIG. 1 is made from sheet metal according to known methods. The cross member 101 has a first pair of sides 114, 116 spaced apart and defining a width or lateral direction W. The cross member 101 also has a second pair of sides 110, 112 spaced apart and defining a length or longitudinal direction L. The cross member 101 includes a front wall 124, a back wall 120 and a floor 122. In this example, the walls 124, 120 are perpendicular to the floor 122 and form a generally rectangular shape. The cross member 101 also includes a rear tab 126, and a front tab 128 having a plurality of through holes 150 for receiving fasteners. Finally, the cross member 101 also includes a plurality of interlocking members 162, 164A, 164B for interlocking with, and maintaining in a fixed relation, the stiffening member 102.

As shown in FIG. 1, the stiffening member 102 is made from a single piece of sheet metal and formed according to known methods. The stiffening member 102 comprises a longitudinal support 130 and has a first end and a second end spaced apart and defining a length L. The length L runs in a generally parallel orientation relative to the back wall 120 of the longitudinal channel. The longitudinal support 130 includes interlocking members 160A, 160B, which are adapted to interlock with the interlocking members 162, 164A, 164B of the cross member 101. Additionally, the longitudinal support member 130 is fastened to the cross member 101 via through-holes 152 formed in tabs such as 140 and 142, which mate with holes 150 formed in the cross member 101. The longitudinal support 130 attaches to a first end support 170A at a first end and a second end support 170B at a second end. The end supports 170A, 170B each have a tab 172A, 172B having through holes for accepting a fastener. According to the example in FIG. 1, the end supports 170A, 170B are attached to the floor 122 of the longitudinal channel with fasteners installed in the through holes of tabs 172A, 172B.

The stiffening member 102 also has several lateral supports 132A, 132B, 132C. The lateral supports have a first end including through holes for installing a fastener therethrough and attaching the lateral support to the front tab 128. The lateral support also has a second end, which is continuous with the longitudinal support 130. In this example, the longitudinal support 130 and the lateral supports 132A, 132B, 132C are fabricated from the same sheet of metal. The stiffening member 102 also includes several vertical supports 134A, 134B, 134C, which extend from, and are continuous with, the lateral supports 132A, 132B, 132C. The vertical supports each have an opposing end having a tab with through holes therethrough for accepting a fastener. Accordingly, the vertical supports 134A, 134B, 134C are each fastened to the floor 122 of the longitudinal channel at such opposing ends.

Figure 2:
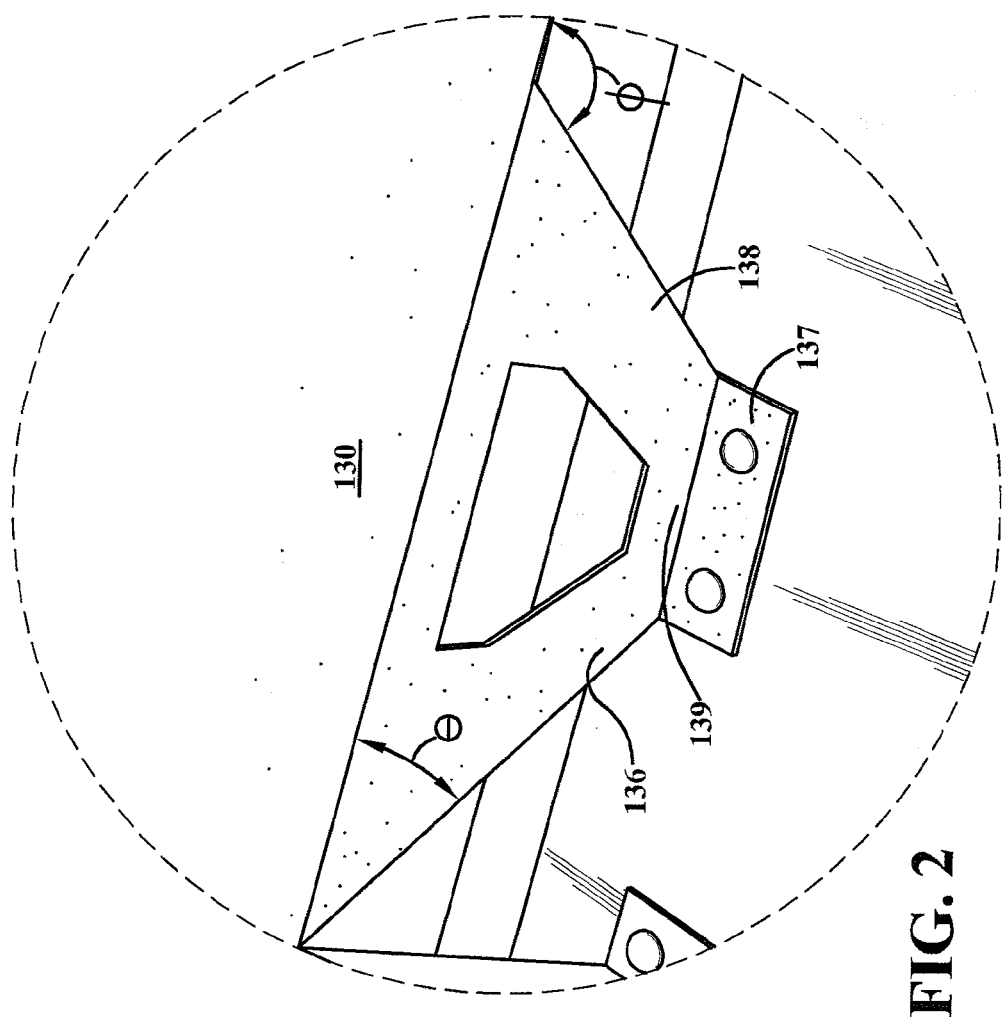
FIG. 2 is a magnified view of a portion of the embodiment in FIG. 1.

The stiffening member 102 also includes a plurality of oblique support members 136, 136B, 138, 138B. The oblique support members 136, 136B, 138, 138B each extend from and are continuous with the longitudinal support 130, and attach to the floor 122 of the longitudinal channel. According to the example in FIGS. 1 and 2, the oblique supports 136, 136B, 138, 138B oppose each other at angles θ and φ as measured from longitudinal member 130. The second ends of the oblique supports 136, 138 connect at a bottom region 139 and form a tab 137 through which the oblique supports 136, 138 are attached to the floor 122 of the longitudinal channel. Also according to FIG. 1, the oblique supports 136B, 138B can be separate from each other.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

Having thus described the invention, it is now claimed:

I claim:

1. An automotive roof reinforcing member, comprising:
a cross member having a longitudinal channel, wherein the longitudinal channel comprises a front wall, back wall and floor; and
a stiffening member disposed at least partially in the longitudinal channel, the stiffening member having:
a continuous longitudinal support extending in the longitudinal direction of the longitudinal channel and substantially parallel to the floor of the longitudinal channel;
at least one lateral support extending from the longitudinal support and substantially parallel to the floor of the longitudinal channel; and
at least one vertical support extending in the vertical direction of the longitudinal channel and extending from the lateral support;
wherein the at least one lateral support has a first end attached to the front wall of the longitudinal channel and a second end in a fixed mechanical relation to the back wall of the longitudinal channel; and
wherein the at least one vertical support has a first end attached to the lateral support and a second end attached to the floor of the longitudinal channel.

2. The device of claim 1, wherein the front wall, back wall and floor of the longitudinal channel are in a generally rectangular relation to each other.

3. The device of claim 1, wherein the thickness of the cross member is from about 0.4 to about 0.8 inch.

4. The device of claim 1, wherein the cross member comprises a material selected from one or more of aluminum, aluminum alloy, steel, stainless steel, or titanium.

5. The device of claim 1, wherein the longitudinal support is attached to the cross member by one or more of adhesively bonding, welding, fusing, soldering, brazing, bolting, riveting, pinning, screwing, press fitting, snap fitting, interlocking.

6. The device of claim 1, wherein the longitudinal support is a continuous portion of the cross member.

7. The device of claim 1, wherein the cross member further comprises a pair of sides spaced apart and defining a length, wherein each of the pair of sides include at least one means for fastening the cross member to an automotive roof assembly.

8. The device of claim 5, wherein the means for fastening is selected from one or more of a through-hole for accepting a fastener, a contour adapted to press-fit to a roof assembly, or a tab for welding to a roof assembly.

9. The device of claim 1, wherein the stiffening member further comprises at least one oblique support extending from the longitudinal support, wherein the at least one oblique support comprises a pair of opposing oblique supports, wherein a first oblique support is at an angle θ relative to the longitudinal support, and a second oblique support is oriented at an angle φ relative to the longitudinal support, wherein θ is an angle from about 30° to 60°, and wherein the sum of angles θ and φ equal 180°.

10. The device of claim 9, wherein an end of each of the opposing pair of oblique supports contacts an end of the other.

11. A vehicle, comprising:
a roof having a forward portion;
a cross member disposed in the forward portion, the cross member having a longitudinal channel, wherein the longitudinal channel comprises a front wall, back wall and floor; and
a stiffening member disposed at least partially in the longitudinal channel, the stiffening member having a continuous longitudinal support, at least one lateral support extending from the longitudinal support, at least one vertical support extending from the lateral support and at least one oblique support extending from the longitudinal support, wherein the at least one lateral support has a first end attached to the front wall of the longitudinal channel and a second end in a fixed mechanical relation to the back wall of the longitudinal channel.

12. The vehicle of claim 11, wherein the at least one longitudinal support comprises a thickness of from about 0.4 to about 0.8 inch.

13. The device vehicle of claim 11, wherein the at least one lateral support comprises a first end and a second end spaced apart and defining a length, and wherein the second end of the at least one lateral support is attached to the longitudinal support by one or more of adhesively bonding, welding, fusing, soldering, brazing, bolting, riveting, pinning, screwing, press fitting, snap fitting, interlocking.

14. The vehicle of claim 11, wherein the at least one lateral support comprises a thickness from about 0.4 to about 0.8 inch.

15. The vehicle of claim 11, wherein the front wall and the back wall and the floor are in a generally rectangular relation to each other, and wherein the at least one vertical support does not contact the front wall or the back wall of the longitudinal channel, and does not contact the longitudinal support.

16. The vehicle of claim 11, wherein the vertical support is attached to each of the lateral support and the floor by a means independently selected from one or more of adhesively bonding, welding, fusing, soldering, brazing, bolting, riveting, pinning, screwing, press fitting, snap fitting, interlocking.

17. The vehicle of claim 11, wherein the at least one vertical support comprises a thickness from about 0.4 to about 0.8 inch.

18. The vehicle of claim 11, wherein the at least one oblique support is angled at about 30 degrees to about 60 degrees relative to the longitudinal support and relative to the floor.

19. The vehicle of claim 11, wherein the oblique support is attached to each of the longitudinal support and the floor by a means independently selected from one or more of adhesively bonding, welding, fusing, soldering, brazing, bolting, riveting, pinning, screwing, press fitting, snap fitting, interlocking.

20. The vehicle of claim 11, wherein the at least one oblique support comprises a thickness from about 0.4 to about 0.8 inch.

21. The vehicle of claim 11, wherein the lateral support is a continuous portion of the longitudinal support.

22. The vehicle of claim 11, wherein the vertical support is a continuous portion of the lateral support or the floor.

23. The vehicle of claim 11, wherein the oblique support is a continuous portion of the longitudinal support or the floor.

24. The vehicle of claim 11, wherein the at least one oblique support comprises a pair of opposing oblique supports, wherein a first oblique support is at an angle $\theta$ relative to the longitudinal support, and a second oblique support is oriented at an angle $\phi$ relative to the longitudinal support, wherein $\theta$ is an angle from about 30° to 60°, and wherein the sum of angles $\theta$ and $\phi$ equal 180°.

25. The vehicle of claim 24, wherein an end of each of the opposing pair of oblique supports contacts an end of the other.

26. A vehicle, comprising:
a roof having a forward portion;
a cross member disposed in the forward portion, the cross member having a longitudinal channel; and
a stiffening member disposed at least partially in the longitudinal channel, the stiffening member having a continuous longitudinal support, at least one lateral support extending from the longitudinal support, at least one vertical support extending from the lateral support and at least one oblique support extending from the longitudinal support;
wherein the at least one oblique support comprises a pair of opposing oblique supports, wherein a first oblique support is at an angle $\theta$ relative to the longitudinal support, and a second oblique support is oriented at an angle $\phi$ relative to the longitudinal support, wherein $\theta$ is an angle from about 30° to 60°, and wherein the sum of angles $\theta$ and $\phi$ equal 180°; and
wherein an end of each of the opposing pair of oblique supports contacts an end of the other.

27. An automotive roof reinforcing device, comprising:
a cross member further comprising:
a top surface and a bottom surface spaced apart from the top surface in a parallel relation and defining a substantially uniform thickness;
a first pair of sides spaced apart from each other and defining a width;
a second pair of sides spaced apart from each other and defining a length, each of the second pair of sides being adapted to attach to an automotive roof assembly; and
a longitudinal channel defined by a contour of the top surface, the channel having a depth and extending along at least a portion of the length of the cross member, and the channel having a front wall, a back wall, and a floor, wherein each of the front wall, the back wall and the floor are defined by the top surface of the cross member and contours thereof; and
a stiffening member disposed at least partially in the longitudinal channel of the cross member, the stiffening member further comprising:
at least one longitudinal support, the longitudinal support attached to the back wall of the channel, extending away from the back wall, and extending along at least a portion of the back wall in a parallel direction;
at least one lateral support, the lateral support having a first end attached to the front wall of the longitudinal channel and a second end in a fixed mechanical relation to the back wall of the longitudinal channel; and
at least one vertical support having a first end attached to the lateral support, and a second end attached to the floor of the longitudinal channel; and
at least one oblique longitudinal support having a first end attached to the longitudinal support and a second end attached to the floor of the longitudinal channel, the oblique support oriented at an oblique angle relative to the longitudinal support.

28. The device of claim 27, wherein an end of each of the opposing pair of oblique supports contacts an end of the other.

* * * * *